Dec. 10, 1929.  R. E. GEARHART  1,738,884
WINDSHIELD WIPER
Filed June 27, 1927  2 Sheets-Sheet 1

INVENTOR.
Roy E. Gearhart
BY
Thorpe & Thorpe  ATTORNEYS.

Dec. 10, 1929.    R. E. GEARHART    1,738,884
WINDSHIELD WIPER
Filed June 27, 1927    2 Sheets-Sheet 2
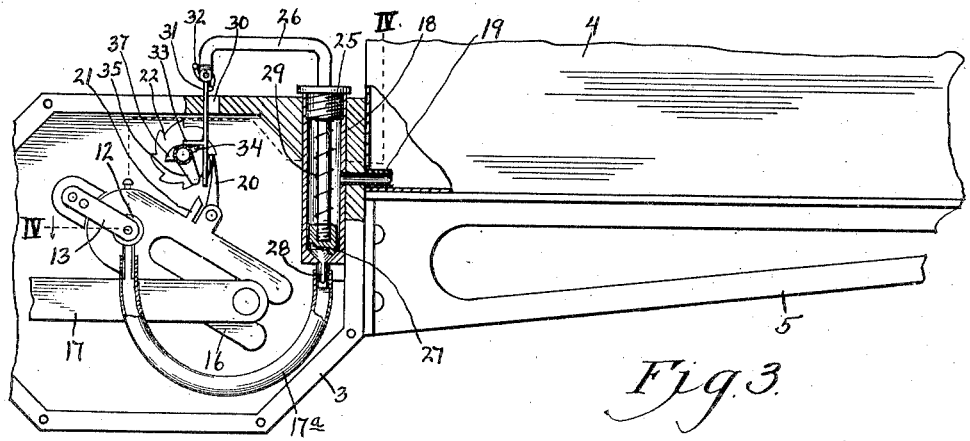

Patented Dec. 10, 1929

1,738,884

UNITED STATES PATENT OFFICE

ROY E. GEARHART, OF KANSAS CITY, MISSOURI, ASSIGNOR OF ONE-HALF TO THOMAS W. LEE, OF KANSAS CITY, MISSOURI

WINDSHIELD WIPER

Application filed June 27, 1927. Serial No. 201,701.

This invention relates to anti-frost wind shield wipers and my object is to provide means whereby a solution may be intermittently or constantly fed to a wiper arm for distribution over the glass. Difficulty has been heretofore encountered on account of the fact that in stormy weather it is impossible to keep sufficient solution on the glass to avoid the formation of frost.

A still further object is to produce a heated wind shield wiper which alone or in combination with the distribution of liquid may be caused to prevent the formation of frost.

With the general objects named in view, the invention consists in certain novel and useful features of combination and organization of parts as hereinafter described and claimed; and in order that it may be fully understood reference is to be had to the accompanying drawings, in which:

Figure 3 is an enlarged front view of the device with the front casing cover removed and partly in section to disclose parts otherwise hidden.

Figure 4 is a section on the line IV—IV of Figure 3.

Figure 5 is an enlarged side elevation of the cam mechanism for the intermittent feed of anti-freeze solution.

Figure 6 is a reduced end view of the wiper arm.

Figure 7 is an enlarged section taken through the wiper arm.

Figure 1:
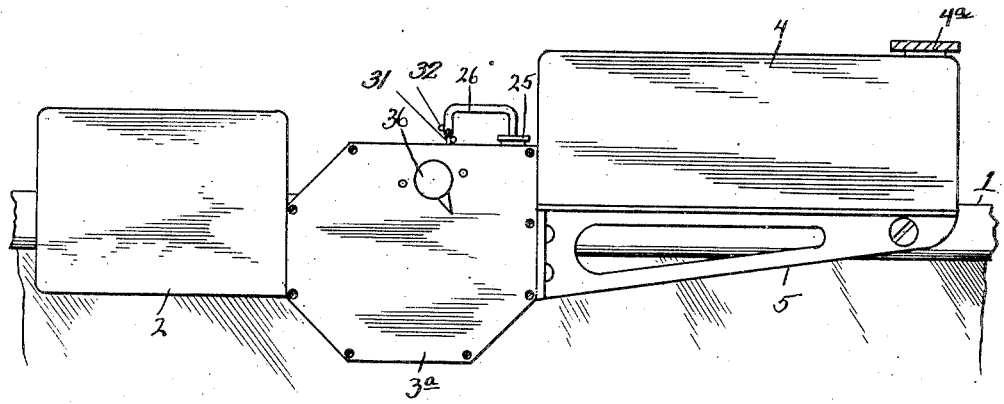
Figure 1 is an elevation of an automatically operated wind shield wiper embodying the invention as it will appear when secured in position to the upper edge of the wind shield.
Figure 2:
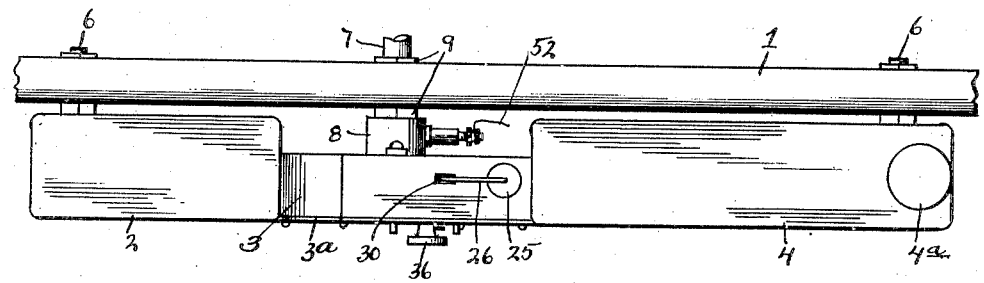
Figure 2 is a top plan view of the same.

In the said drawings, where like reference characters identify corresponding parts in all of the figures, 1 indicates the upper end of a wind shield frame or the upper part of the frame of the car closely adjacent the glass, and 2, 3 and 4, respectively, indicate the motor or driving casing, the feed or operating casing, and a liquid supply tank, the latter being supported in any suitable manner on a bracket or other frame 5 secured to the operating casing 3 and having a filling opening $4^a$, the entire structure being secured to the frame 1 by means of bolts 6 carried by casing 2 and tank 4 as illustrated. The operating casing 3 is provided with a removable face plate $3^a$.

Secured to the casing 3 and registering with an opening in the back wall thereof is a tubular member 7 which is formed with a reduced tubular extension portion 8 projecting through the frame 1 and held in position by nuts 9. Journaled for oscillation within the tube 8 is a hollow shaft 10, the inner end of which within the casing 2 is provided with an opening permanently receiving the flared end of a liquid feed tube 11, the liquid being fed to said tube by a cap-piece 12 held under the pressure of a spring arm 13 with its bevelled face in liquid-tight relation with the bevelled end of the hollow shaft as illustrated. To the outer end of the hollow shaft 10, a two-piece wiper arm clamp member 14 is secured, the corresponding end of the tube 11 within member 14 being engaged by a rubber tube or the like 15 leading downwardly to the wiper arm. From a consideration of the parts described, it will be evident that if liquid is fed to the cap-piece 12 it will flow through the tube 11 to the wiper arm and that such feeding may occur while the wiper is in operation.

Although any desired means may be utilized for oscillating the shaft 10, I have illustrated a bifurcated lever 16 between the legs of which is received the end of a reciprocatory lever 17, operated in any suitable manner by automatically or manually operated mechanism within the casing 2. In order to supply liquid to the cap-piece 12, a tube $17^a$ is connected thereto, the other end of said tube having communication with a well 18 which is fitted within the casing 3 and is fed by gravity with liquid from a tube 19 in communication with the liquid supply tank 4.

To provide for the intermittent or continuous feed of liquid through the passageways just described, the operating lever 16 is provided with a pivoted spring advanced dog 20, which is prevented from moving beyond a predetermined point by a stop 21 carried by the lever, said dog 20 upon each oscillation of the wind shield shaft, advancing a star wheel 22 one step, said star wheel being journaled on a stub shaft 23 having a bearing at one end in a recess in the housing 3 and having its opposite end received within the bore of a hollow shaft 24 carried by the cover plate 3ª of said casing 3. With the parts as illustrated the stub shaft 23 is revolved once for each eight oscillations of the wind shield wiper arm.

The liquid well 18 is closed at its upper end by a stuffing box 25 and extending through said stuffing box is a valve operating rod 26 bearing at its lower end a bevelled valve 27 fitted in the beveled lower end of the well 18 and having a downwardly-projecting guide stem 28, the valve being normally closed by an expansion spring 29 within the well. The other end of the rod 26 is bifurcated and pivoted within said bifurcation and extending through a slot 30 in the top of the casing 3 is an operating member 31, it being noted that said operating member 31 is normally held in vertical position under the action of a coil spring 32 on the rod 26, and being formed with a laterally projecting lifting foot 33 overlying the stub shaft 23 and the end of the tubular shaft 24. For intermittently opening the valve 27 once in each revolution of the parts as illustrated, the stub shaft 23 is formed with a cam 34 underlying the lifting foot 33, it being evident that once in each eight oscillations of the wind shield wiper arm, the valve 27 will be opened to permit a predetermined quantity of liquid to flow from the well 18.

As means must be provided to prevent operation of the star wheel 22 from opening the valve 27 in warm weather or when it is not desired to use the liquid, the hollow shaft 24 is formed adjacent its end with a cam 35, and exteriorly of the device carries a manually operable knob or handle 36, whereby when the shaft 24 is turned in the proper direction, the cam 35 will strike the depending member 31 and cause it to move rearwardly around its pivot against the action of the spring 32, the lifting foot 33 thus being moved entirely out of the path of travel of the cam 34. As it may be desirable under certain conditions to flood the wiper with liquid, said hollow shaft 24 is also formed on its end with a cam 37 whereby upward pressure may be applied to the lifting foot 33 to open and maintain the valve 27 in open position, the liquid being fed either constantly in a small quantity or intermittently in a large quantity, or if the cam is moved sufficiently far the liquid is constantly fed in a large quantity.

The wind shield wiper arm comprises a channel shaped clamping member 38 having a pair of ears 39 on its rear face and preferably intermediate its length between which one end of a resilient supporting strap 40 is secured so that the wiper arm may accommodate itself to the angle of the wind shield, the other end of said strap 40 resting against the member 14 and being held in position by a clamp plate and screw 41, the edges of the clamp plate embracing the sides of the member 14 so that the strap 40 will not shift from position.

Fitted side by side within the channel 38 are a hollow flattened liquid feeding tube 42 and a flattened tube 43 containing a heating element 44, said tubes 42 and 43 being encircled by a suitable felt or other absorbent swab 45 as illustrated most clearly in Figure 7. The upper end of the liquid tube 42 is connected to the tube 15, and the said tube 42 is provided with a series of openings 46 whereby liquid may escape for penetration into the enveloping swab 45 as will be readily understood.

As under certain conditions it may be desirable or necessary to heat the swab to assist in the removal of ice or the like on the glass or to insure the ready and quick flow of an anti-freeze mixture which might have a tendency to coagulate in cold weather, the heating arm 44 is supplied, and in order to heat said element, it being understood that the metal parts are grounded to the frame as customary, an electric wire 47 is connected to the element and said wire passes up through the member 14 and through the tube 10. At a convenient point in the length of the tube 10, preferably within the enlarged portion 8 of the bearing, an opening 48 is formed through which the wire extends and is fixed to a brass or other conducting ring 49, carried by an insulating collar 50 secured to the tube 19. Current is transmitted to the ring and consequently to the heating element through a spring advanced carbon brush 51 connected to a wire 52 leading to the battery or other suitable source of power. It will be evident that a switch and rheostat may be provided for the control and regulation of the current.

From the above description it will be apparent that while I have produced a device possessing all the features of advantage pointed out, it will be understood that I reserve the right to make such modifications as fall within the spirit and scope of the appended claims.

I claim:

1. A wind shield wiper comprising a wiper arm adapted to distribute liquid, a hollow shaft for oscillating said arm and having its bore communicating therewith, a liquid supply tank, and a tube connecting said shaft and tank.

2. A wind shield wiper comprising a wiper arm adapted to distribute liquid, a shaft for oscillating said arm, valve-operating means actuated in timed relation to the oscillation of said shaft, a liquid supply tank, a tube connecting said hollow wiper arm and liquid supply tank, and a valve actuated by said timed valve-operating means for controlling the flow of liquid through said tube.

3. A wind shield wiper comprising a wiper arm adapted to distribute liquid, a shaft for oscillating said arm, valve-operating means actuated in timed relation to the oscillation of said shaft, a liquid supply tank, a tube connecting said wiper arm and liquid supply tank, a valve actuated by said timed means for controlling the flow of liquid through said tube, and means for preventing actuation of said valve.

4. A wind shield wiper comprising a wiper arm adapted to distribute liquid, a shaft for oscillating said arm, valve-operating means actuated in timed relation to the oscillation of said shaft, a liquid supply tank, a tube connecting said wiper arm and liquid supply tank, a valve actuated by said timed valve-operating means for controlling the flow of liquid through said tube, and manually operable means for maintaining said timed valve-operating means against operation and for opening and closing said valve.

5. A wind shield wiper comprising a wiper arm adapted to distribute liquid, a hollow shaft for oscillating said arm and having its bore in communication with the wiper arm, a liquid supply tank, a connection between said tank and hollow shaft, a valve controlling said connection, and manually operable means for opening or closing said valve.

6. A wind shield wiper arm comprising a liquid distributing member and a heating element arranged in abutting relation, a swab enclosing said members, and an oscillating arm carrying said swab.

7. A wind shield wiper arm comprising a liquid distributing member, a heating element, and a swab.

8. In a wind shield wiper, the combination with a liquid supply tank, of a wiper arm adapted to distribute liquid on a wind shield and having a liquid supply tube extending to and connected to said tank, and means to heat the liquid.

9. A wind shield wiper comprising a wiper arm adapted to distribute liquid, a shaft for oscillating said arm, a liquid supply tank, a tube connecting said wiper arm and liquid supply tank, and means operated in timed relation to said shaft to control the flow of liquid from said tank.

In testimony whereof I affix my signature.

ROY E. GEARHART.